US010087297B2

(12) United States Patent
Casalini et al.

(10) Patent No.: US 10,087,297 B2
(45) Date of Patent: Oct. 2, 2018

(54) SELF-EXTINGUISHING POLYMERIC COMPOSITION

(71) Applicant: Versalis S.P.A., S. Donato Mil.se (IT)

(72) Inventors: Alessandro Casalini, Mantova (IT); Aldo Longo, Mantova (IT); Antonio Ponticiello, Verona (IT); Giuditta Vannucci, Castelfranco di Sotto (IT)

(73) Assignee: Versalis, S.p.A., San Donato Milanese (IT)

( * ) Notice: Subject to any disclaimer, the term of this patent is extended or adjusted under 35 U.S.C. 154(b) by 0 days.

(21) Appl. No.: 14/441,673

(22) PCT Filed: Nov. 15, 2013

(86) PCT No.: PCT/IB2013/060157
§ 371 (c)(1),
(2) Date: May 8, 2015

(87) PCT Pub. No.: WO2014/080326
PCT Pub. Date: May 30, 2014

(65) Prior Publication Data
US 2015/0299410 A1 Oct. 22, 2015

(30) Foreign Application Priority Data

Nov. 20, 2012 (IT) .............................. MI2012A1973

(51) Int. Cl.
| C08F 212/08 | (2006.01) |
| C08F 293/00 | (2006.01) |
| C08F 8/06 | (2006.01) |
| C08J 9/00 | (2006.01) |
| C08K 3/04 | (2006.01) |
| C08K 5/00 | (2006.01) |
| C08L 25/06 | (2006.01) |
| C08L 25/08 | (2006.01) |
| C08L 51/04 | (2006.01) |
| C08L 51/06 | (2006.01) |
| C08L 53/00 | (2006.01) |

(52) U.S. Cl.
CPC .............. *C08J 9/0061* (2013.01); *C08F 8/06* (2013.01); *C08F 212/08* (2013.01); *C08F 293/005* (2013.01); *C08K 3/04* (2013.01); *C08K 5/0066* (2013.01); *C08L 25/06* (2013.01); *C08L 51/04* (2013.01); *C08L 51/06* (2013.01); *C08L 53/00* (2013.01); *C08F 2438/02* (2013.01); *C08J 2325/06* (2013.01); *C08J 2325/14* (2013.01); *C08L 25/08* (2013.01)

(58) Field of Classification Search
CPC ....................................................... C08L 25/08
See application file for complete search history.

(56) References Cited

U.S. PATENT DOCUMENTS

| 4,032,481 | A | 6/1977 | Pillar |
| 4,051,199 | A | 9/1977 | Udipi et al. |
| 4,131,725 | A | 12/1978 | Udipi |
| 6,576,692 | B1 | 6/2003 | Ohtsuka et al. |
| 6,903,164 | B2 | 6/2005 | Yabui et al. |
| 7,320,585 | B2 | 1/2008 | Casalini |
| 2010/0041800 | A1 | 2/2010 | Son et al. |
| 2010/0331497 | A1 | 12/2010 | Vogel et al. |
| 2011/0046249 | A1* | 2/2011 | Ponticiello ............. C08J 9/0066 521/60 |

FOREIGN PATENT DOCUMENTS

| DE | 3402539 | | 8/1984 |
| EP | 0066686 | | 12/1982 |
| EP | 0848727 | | 12/1999 |
| EP | 0960909 | | 12/1999 |
| JP | 2000103952 | | 4/2000 |
| JP | 2008189823 | A * | 8/2008 |
| WO | WO2004005361 | | 1/2004 |
| WO | WO2008085513 | | 7/2008 |
| WO | WO2011008417 | | 1/2011 |

OTHER PUBLICATIONS

English-language abstract and machine translation of JP 2008189823 A to Sato et al. obtained from the Japan Patent Office on Jan. 23, 2016.*
English-language abstract and machine translation of JP 2000103952 A to Nodera et al. obtained from the Japan Patent Office on Jan. 23, 2016.*
International Report on Patentability dated Nov. 7, 2014 for PCT/IB2013/060157.
International Search Report dated Feb. 7, 2014 for PCT/IB2013/060157.
Xanthos M., et al. "Compatibilization of Polymer Blends by Reactive Processing," Polymer Engineering and Science 31(13) pp. 929-935 (1991).
Ayres J.T., et al. "Some chemical reactions of poly(p-chloromethylstyrene) resin in dimethylsulfoxide," Journal of Polymer Science, Part B: Polymer Letters 3(6) pp. 505-508, (1965).

(Continued)

Primary Examiner — Melissa A Rioja
(74) Attorney, Agent, or Firm — Abel Law Group, LLP

(57) ABSTRACT

The present invention relates to a self-extinguishing polymeric composition comprising: a) a stabilizing polymeric composition containing i) from 80% to 99.5% by weight of one or more vinylaromatic polymers compatible with each other; and ii) from 0.5% to 20% by weight of at least one block copolymer containing: 1) at least one vinylaromatic polymer block compatible N with (i) and constituting a weight quantity equal to or higher than 15% by weight with respect to the whole block copolymer, and 2) at least one vinyl copolymer block containing epoxy groups so that there is from 0.7% to 19% by weight of oxirane oxygen calculated on the total of block copolymer; and b) from 0.03 phr by weight to 10 phr by weight, calculated on the basis of component (a), of at least one halogenated flame retardant.

17 Claims, No Drawings

(56) References Cited

OTHER PUBLICATIONS

Tomoi M., et al. "Synthesis and crosslinking of polystyrenes containing a pendant epoxy group," Makromolekulare Chemie, Rapid Communications, vol. 7, pp. 143-148 (1986).
Fitzer, E., et al. "Recommended terminology for the description of carbon as a solid (IUPAC Recommendations 1995)." Pure and Applied Chemistry 67.3 (1995): 473-506.
"IUPAC Compendium of Chemical Terminology—the Gold Book." http://goldbook.iupac.org.
"Standard for Tests for Flammability of Plastic Materials for Parts in Devices and Appliances" 3 Edition, Jan. 28, 1980.
Muller, et al. "Controlled and Living Polymerization Method and Materials," Wiley-VCH Verlag GmbH & Co. Weinheim, 2009.

\* cited by examiner

SELF-EXTINGUISHING POLYMERIC COMPOSITION

The present invention relates to a stabilized self-extinguishing polymeric composition.

In the preparation of polymeric compositions having flame-retardant properties based on vinylaromatic polymers, halogenated organic additives are used, in which the halogen is bromine and/or chlorine. Said additives can be mixed in the molten state with the polymeric mass to provide an improved fire-resistance.

A halogenated organic additive is a compound which releases halogen radicals at the flash points, so that the radicals produced by reaction with atmospheric oxygen react with said halogen radicals instead of with the vinylaromatic polymeric compound. A good halogenated flame-retardant additive must be miscible with the polymeric mass, stable at the mixing temperature (180° C.-230° C.) and unstable at the flash points.

Halogenated organic compounds suitable as flame-retardants, such as hexabromocyclododecane and brominated styrene-butadiene copolymers, are effective for passing standard flame-resistance tests and have a good miscibility with the vinylaromatic polymer; they can, however, release significant quantities of hydrogen halide at the temperatures at which the mixtures are prepared with the vinylaromatic polymer.

In order to avoid instability of the halogenated organic compound, basic reactive inorganic substances such as oxides or hydroxides of alkaline and alkaline-earth metals, and organic substances containing epoxides which capture the hydrogen halide produced during the mixing, can be added in the mixing phase with the polymer. Said compounds react with the hydrogen halide which develops, forming stable halogen salts and halohydrins which, however, reduce the halogen available for the flame-retardant action in the polymeric mixture.

It is therefore known in the state of the art that compounds containing epoxy groups can be used as further additives, in addition to the flame-retardant, for improving the stability of self-extinguishing polymers. The use of halogenated flame retardants containing epoxy groups is also known. Some patent documents of the known art are briefly described hereunder.

U.S. Pat. No. 4,032,481 discloses a process for preparing expandable polystyrene with a reduced flammability. The process is carried out in aqueous suspension at temperatures not higher than 115° C., in the presence of halogenated flame-retardant agents, epoxidized soybean oils, glycidyl ether of bisphenol A, barium salts of phenol derivatives, cadmium salts of organic acids and cresol phosphites.

EP 0066686 describes a polymeric composition containing expandable polystyrene and a quantity lower than 0.1% by weight of epoxidized aliphatic hydrocarbons, having from 6 to 18 carbon atoms, soluble in the vinylaromatic monomer. Said composition allows the minimum residence time at the expansion temperatures to be increased to allow the end-product to be cooled without deteriorating the structure of the cells forming the expanded end-product. The miscibility of the epoxidized hydrocarbons in the monomer does not guarantee a good dispersion of the same in the polymer obtained by polymerization of the monomeric mixture.

DE 3402539 discloses polyolefins, vinylaromatic polymers and polyesters with an improved stability to degradation containing a flame-retardant, such as tetrabromobisphenol A bis(dibromopropyl) ether or hexabromocyclododecane, and an epoxy resin of bisphenol A epichlorohydrin.

EP 848727 relates to polymeric compositions containing hexabromocyclododecane and an epoxy resin as thermal stabilizer. The epoxy resins used contain a halogen, bromine or chlorine, and have an epoxide equivalent ranging from 150 g/eq to 800 g/eq. A particular composition described in EP 848727 comprises polystyrene or copolymers of styrene and at least one halogenated epoxy resin in a quantity equal to at least 0.5% by weight.

WO 2011/008417 (also US 2010331497) describes a brominated and epoxidized organic compound, contemporaneously containing bromine and at least one epoxy group. Said compound is used as flame-retardant in polymers and copolymers of styrene.

This compound is obtained starting from polymers and copolymers of a conjugated diene monomer, preferably butadiene, such as for example styrene/butadiene copolymers and block copolymers. In one phase, said polymers and copolymers are brominated with suitable brominating agents and in another phase epoxidized with a suitable oxidizing agent according to an arbitrary order.

An objective of the present invention is to improve the thermal stability of halogenated flame-retardant agents in self-extinguishing polymeric compositions containing vinylaromatic polymers, maintaining the efficacy of the flame-retardant agents and in economically advantageous concentrations.

The more uniformly the halogenated additives are distributed in a polymeric composition, the greater their effectiveness in delaying flame propagation will be. The more uniformly the epoxy groups are distributed over the whole volume of the polymeric composition, the more effective the stabilization of the flame retardants due to the presence of said epoxy groups in the polymeric compositions, will be.

One of the ways for guaranteeing a uniform distribution of epoxy groups in the compositions of vinylaromatic polymers can be by copolymerizing vinylaromatic monomers with one or more vinyl monomers containing epoxy groups, so that all the polymer chains formed contain epoxy groups randomly distributed. This synthesis method is not particularly flexible and requires a modification of the whole vinylaromatic polymeric composition in the synthesis phase.

A mixture of vinylaromatic copolymers and vinylaromatic copolymers containing epoxy groups (obtained by random copolymerization of vinylaromatic monomers and vinyl monomers with epoxy groups or by the epoxidation of reactive vinylaromatic copolymers) can normally be considered as being sufficiently uniform if the content of epoxy groups in the vinylaromatic copolymer is lower than 0.5% expressed as oxirane oxygen mass with respect to the total mass of random copolymer containing it.

In many cases, however, it is simpler and economically more advantageous to add both flame-retardant additives and stabilizers containing epoxy groups in concentrated form to the vinylaromatic composition, to avoid having to modify the whole composition of vinylaromatic copolymers in the synthesis.

In order to be effective in standard flame-resistance tests, both the flame-retardant additives and epoxy stabilizers must be uniformly dispersed in the vinylaromatic polymeric composition, thus avoiding having to use excessive quantities and also altering the behaviour properties of the polymeric composition itself as little as possible.

In order to improve the thermal stability of halogenated flame-retardant agents in the polymeric compositions, the Applicant has identified a block copolymer comprising blocks of copolymer obtained from vinylaromatic monomers and blocks of polymer containing epoxy groups. Said block copolymer is uniformly distributed in the polymeric composition and is capable of stabilizing the hydrogen halide formed by a halogenated organic additive normally used as flame retardant. In particular, almost every molecule of hydrogen halide which develops in the self-extinguishing polymeric composition, reacts with an epoxy group, in a ratio therefore of about 1:1, surprisingly without limiting the efficacy of the action of the halogenated additive in standard flame-resistance tests of said compositions.

For the purposes of the present invention, a block copolymer is uniformly distributed in a polymeric composition when it is finely dispersed so as to form a uniform mixture even if heterogeneous.

A homogeneous distribution of the block copolymer in the polymeric composition is important as it allows the whole composition to be protected with a minimum quantity of epoxy groups.

Furthermore, the halohydrins formed following the reaction of the epoxy groups with hydrogen halide still act as flame retardants.

An object of the present invention therefore relates to a self-extinguishing polymeric composition comprising:
a) a stabilizing polymeric composition containing
   i) from 80% to 99.5% by weight of one or more vinylaromatic polymers compatible with each other; and
   ii) from 0.5% to 20% by weight of at least one block copolymer containing:
      1) at least one vinylaromatic polymer block compatible with (i) and constituting a weight quantity equal to or higher than 15% by weight with respect to the whole block copolymer, and
      2) at least one vinyl copolymer block containing epoxy groups so that there is from 0.7% to 19% by weight of oxirane oxygen calculated with respect to the total block copolymer; and
b) from 0.03 phr by weight to 10 phr by weight, calculated on the basis of component (a), of at least one halogenated flame-retardant agent.

The presence of epoxy groups is effective in protecting the whole self-extinguishing polymeric composition from degradation induced by the release of halogens deriving from the halogenated additives, at the temperatures adopted for mixing the same additives.

With an oxirane oxygen content lower than 0.7% by weight in the block copolymer, the use of a block copolymer with respect to a simpler random copolymer to be synthesized is not advantageous as, with a low content of epoxy groups, the random copolymer is uniformly distributed in the polymeric composition of vinylaromatic polymers. An oxirane oxygen content higher than 19% by weight in the block copolymer is difficult to obtain and economically disadvantageous.

The improved stability obtained together with a surprising maintenance of self-extinguishing efficacy lead to a reduced use of halogenated additives and a lesser production of hydrogen halides. A further advantage deriving from the improved stability is that self-extinguishing vinylaromatic polymeric compositions with a greater viscosity can be processed, at higher temperatures, and end-products having enhanced behavioural properties can thus be obtained.

DETAILED DESCRIPTION

For the purposes of the present invention, the term "comprise" or "include" also comprises the case "essentially consisting of" or "only consisting in".

For the purposes of the present invention, phr, defined as "parts per 100 parts of the formulation" means "parts per 100 parts of component (a)".

The present invention relates to a self-extinguishing polymeric composition comprising:
a) a stabilizing polymeric composition containing
   i) from 80% to 99.5% by weight of one or more vinylaromatic polymers compatible with each other; and
   ii) from 0.5% to 20% by weight of at least one block copolymer containing:
      1) at least one vinylaromatic polymer block compatible with (i) and constituting a weight quantity equal to or higher than 15% by weight with respect to the whole block copolymer, and
      2) at least one vinyl copolymer block containing epoxy groups so that there is from 0.7% to 19% by weight of oxirane oxygen calculated with respect to the total block copolymer; and
b) from 0.03 phr by weight to 10 phr by weight, calculated on the basis of component (a), of at least one halogenated flame-retardant agent.

The vinylaromatic polymers (i) used in the compositions object of the present invention can be polymers obtained by homo- or copolymerization of vinylaromatic monomers having general formula (I):

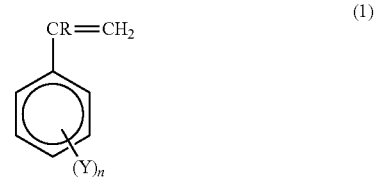

wherein R is a hydrogen or a methyl group, n is zero or an integer ranging from 1 to 3, Y is a halogen, such as chlorine or bromine, or a chloromethyl or an alkyl or alkoxyl group having from 1 to 3 carbon atoms.

Preferred vinylaromatic monomers having general formula (I) are selected from styrene, α-methylstyrene, isomers of vinyltoluene, isomers of ethylstyrene, isomers of propylstyrene, isomers of chlorostyrene, isomers of methylchlorostyrene, isomers of methoxystyrene, isomers of acetoxystyrene, hydroxystyrene, isomers of methylhydroxystyrene and mixtures thereof. Said vinylaromatic monomers can be more preferably selected from styrene and α-methylstyrene.

The vinylaromatic polymers (i) used in the compositions, object of the present invention, can be copolymers comprising, as main components, vinylaromatic monomers having formula (1) and vinyl comonomers selected from dienes, nitriles, $C_1$-$C_8$ alkyl esters derivatives of acrylic and methacrylic acid, vinylacetate and mixtures of the same, more preferably styrene-butadiene, styrene-isoprene, hydrogenated styrene-butadiene, hydrogenated styrene-isoprene, styrene-acrylonitrile, styrene-alkylacrylate, styrene-alkylmethacrylate, styrene-butadiene-alkylacrylate, styrene-butadiene-alkylmethacrylate, styrene-acrylo-nitrile-alkylacrylate, styrene-vinylacetate.

The vinylaromatic polymers (i) used in the compositions, object of the present invention, can be mixtures of vinylaromatic copolymers toughened with other copolymers, preferably polyethylenes, ethylene-vinylacetate copolymers, diene polymers, ethylene-propylene-diene terpolymers, block polymers such as styrene-butadiene, styrene-isoprene, styrene-ethylene-butylene-styrene, hydrogenated styrene-butadiene, hydrogenated styrene-isoprene.

The vinylaromatic polymers (i) used in the compositions, object of the present invention, can be vinylaromatic copolymers grafted on other polymers preferably those obtained from styrene, styrene-acrylonitrile, styrene-methylmethacrylate, styrene-butylacrylate, styrene-acrylonitrile-methyl-methacrylate, styrene-acrylonitrile-butylacrylate, styrene-acrylonitrile-maleimide grafted on polyethylenes, ethylene-vinylacetate copolymers, diene polymers, ethylene-propylene-diene terpolymers, block polymers such as styrene-butadiene, styrene-isoprene, styrene-ethylene-butylene-styrene, hydrogenated styrene-butadiene, hydrogenated styrene-isoprene.

The block copolymers (ii) can be obtained by controlled chain radical copolymerization such as Nitroxy Mediated Polymerization (NMP), Atom Transfer Radical Polymerization (ATRP), Reversible Addition Fragmentation Transfer (RAFT) as described in Controlled and Living Polymerization Method and Materials edited by Axel H. E. Willer and Krzysztof Matyjaszewski and published by Wiley-VCH Verlag GmbH & Co. Weinheim in 2009: In particular, block copolymers of vinylaromatic monomers can be conveniently synthesized via NMP as described in EP 0960909 and in WO 2004/005361.

The block copolymers (ii) can also be obtained by grafting copolymers containing epoxides on copolymers of vinylaromatic monomers and monomers such as acrylic, methacrylic acid and maleic anhydride as described by Xanthos M. and Dagli S. S. in Polymer Engineering and Science 31(13) pages 929-935 (1991).

The block copolymers (ii) can also be obtained by the epoxidation of block copolymers containing unsaturations such as, for example, styrene-butadiene, styrene-butadiene-styrene block copolymers which can be epoxidized as described in U.S. Pat. Nos. 4,051,199, 4,131,725, 6,576,692, 6,903,164 and in US 2010/0331497.

The block copolymers (ii) can also be obtained by epoxidation, with epichlorohydrin, of vinylaromatic block copolymers substituted in the benzene ring, in one of the blocks, with hydroxyl or hydroxymethyl groups, as described by Ayres J. T. and Mann C. K. in Journal of Polymer Science, Part B: Polymer Letters 3(6) pages 505-508, (1965).

The block copolymers (ii) must contain at least one block of vinylaromatic copolymer compatible with (i) in order to favour the uniform dispersion of (ii) in (i).

The vinylaromatic block polymer compatible with (i) must be at least 15% by weight of the block copolymer (ii) and its composition must be equal to or in any case such as to be compatible with the vinylaromatic polymers (i).

The vinyl monomers containing epoxy groups used in the present invention can be selected from styrenes substituted on the benzene ring, epoxidized derivatives of hydroxystyrene and hydroxymethylstyrene, ester derivatives of acrylic and methacrylic acid and epichlorohydrin or oligomers of bisphenol and epichlorohydrin. Said vinyl monomers containing epoxy groups can be more preferably selected from glycidylmethacrylate, glycidyloxystyrene and 2,3-epoxypropylvinylbenzylether and the products deriving from the reaction of hydroxystyrene, hydroxymethylstyrene and methacrylic acid with epoxy resins composed of bisphenols and epichlorohydrin. Glycidyloxystyrene can be prepared as described in WO 2008/085513 and 2,3-epoxypropylvinylbenzylether as described by Tomoi M., Oda H. and Kakiuchi in Makromolekulare Chemie, Rapid Communications, Vol. 7, pages 143-148 (1986). The vinyl monomer containing epoxy groups which is most widely-used and available on a commercial scale is glycidylmethacrylate.

The self-extinguishing compositions described and claimed in the present text can comprise at least one flame-retardant agent containing a halogenated substance on aliphatic carbons. Said flame-retardants can be selected from hexabromocyclododecane, pentabromomono chlorocyclhoexane, pentabromophenyl-allylether, a brominated styrene-butadiene copolymer, tetrabromobisphenol A bis-dibromopropyl ether. The halogenated flame-retardants can be preferably present in a quantity ranging from 0.03 phr by weight to 10 phr by weight, calculated on the basis of component (a).

The self-extinguishing compositions, object of the present invention, can also comprise a quantity ranging from 0 phr by weight to 4 phr by weight, calculated on the basis of component (a), of a synergic agent, more preferably from 0.1 phr by weight to 1 phr by weight. The synergic agent is present in particular in the self-extinguishing polymeric compositions, object of the present invention, which also comprise an expanding agent, from which expanded articles and polymeric foams can be obtained. A synergic agent is defined as a substance capable of generating radicals which induce the degradation of the halogenated flame-retardant agent with the formation of halogen radicals at the flash points.

Said synergistic agent can preferably be selected from a peroxide or unstable hydrocarbon. The synergic agent is more preferably selected from 2,3-dimethyl-2,3-diphenylbutane, 3,4-dimethyl-3,4-diphenylhexane, 3,6,9-triethyl-3,6,9-trimethyl-1,4,7-triperoxynonane.

For the production of expanded articles and therefore in expandable self-extinguishing polymeric compositions, the self-extinguishing compositions, object of the present invention, can also comprise a quantity ranging from 0.2 phr by weight to 10 phr by weight, calculated on the basis of component (a), of an expanding agent, more preferably from 1 phr by weight to 10 phr by weight.

Any expanding agent commonly used, capable of being englobed in a vinylaromatic polymer, can be used in the compositions, object of the present invention. Examples of expanding agents used are aliphatic hydrocarbons, Freon, carbon dioxide, alcohols such as ethyl alcohol, water.

For the production of expanded articles or polymeric foams for applications in thermal insulation, the self-extinguishing compositions, object of the present invention, can also comprise a quantity ranging from 0 phr by weight to 25 phr by weight, more preferably from 0.2 phr by weight to 25 phr by weight, even more preferably from 1 phr by weight to 20 phr by weight, calculated on the basis of component (a), of an athermanous additive. The athermanous additive is more preferably selected from carbon black, coke or graphite, the athermanous additive is even more preferably coke.

Carbon coke (or simply coke) is available as a finely subdivided powder with a powder particle size (MT50) ranging from 0.5 to 100 microns, preferably from 2 to 20 microns. The particle size (MT50 or $d_{50}$) is measured with a laser granulometer and is the diameter which corresponds to 50% by weight of particles having a smaller diameter and 50% by weight of particles having a larger diameter. Diameter refers to the particle size measured with a laser granulometer as described above.

Coke is produced by the pyrolysis of organic material and at least partly passes through a liquid or liquid-crystalline state during the carbonization process. The starting organic material is preferably petroleum, carbon or lignite.

The coke used in the preparation of the polymeric compositions in granule form, object of the present invention, is more preferably the carbonization product of the high-boiling fraction of hydrocarbons coming from the distillation of petroleum, conveniently known as heavy residual fraction. In particular, coke is obtained starting from the coking of the heavy residual fraction, an operation carried out at a high temperature which still produces further light fractions and a solid (petroleum coke). The petroleum coke thus obtained, is calcined at a temperature ranging from 1000 to 1600° C. (calcined coke).

If a heavy residual fraction rich in aromatic components is used, a coke with a needle-like crystalline structure (needle coke) is obtained, after calcination at 1800-2200° C.

Greater details on coke, the production methods and characterization of the various grades commercially available (green coke, coal-derived pitch coke, delayed coke, fluid coke, needle coke, premium coke, calcined coke, shot, spange, etc.) can be found in internet, in the site: goldbook.iupac.org or in Pure Appl. Chem., 1995, Vol. 67, N. 3, pages 473-506 "Recommended terminology for the description of carbon as a solid (IUPAC Recommendations 1995)".

Athermanous additives are mainly used as additives in panels in the building industry, consisting of vinylaromatic polymers expanded or foamed with expanding agents, and are mainly composed of carbon in the form of coke, natural or expanded graphite and carbon black. These additives reduce the thermal stability of the halogenated flame-retardant agent and impose lower mixing temperatures with the vinylaromatic polymer with consequent difficulties in the mixing itself due to the high viscosities of the polymeric mass. Other inorganic additives that absorb radiation between 100 $cm^{-1}$ and 20000 $cm^{-1}$, as revealed by a near-medium infrared light analyzer, are titanates, titanium oxides, silicon oxides, oxides and hydroxides of aluminium, barium sulfate, aluminosilicates, calcium and magnesium silicates, calcium and magnesium carbonates, calcium and zinc oxide, bentonite.

The compositions, object of the present invention, are particularly effective when they contain coke as athermanous additive. Said compositions are therefore particularly advantageous for the production of expanded articles to be used in thermal insulation. In these cases, in fact, a significant decrease in the formation phenomenon of hydrogen halides induced by the thermal degradation of the flame-retardant, is observed, as also illustrated by the examples provided in the present text.

For the production of compact articles, the self-extinguishing compositions described and claimed in the present text can comprise a quantity ranging from 0 phr by weight to 50 phr by weight, preferably from 0.01 phr by weight to 10 phr by weight, calculated on the basis of component (a), of one or more additives consisting of lubricants, dyes, antistatic agents, detaching agents, antioxidants.

In the compact articles which are almost always processed at a T higher than 180° C., no particular effects induced by the flame-retardant additives can be observed. The advantage of copolymers with epoxides consists in being able to use smaller quantities of flame-retardant additive and/or not have to use low-viscosity matrixes for processing the polymeric blend at temperatures lower than 200° C. Low-viscosity matrixes, in fact, have poorer mechanical properties.

This advantage is revealed in the examples on HIPS illustrated.

The self-extinguishing polymeric compositions described and claimed in the present text can be used for the production of compact articles, expandable beads, expanded articles or polymeric foams.

The compositions, object of the present invention, are particularly suitable for applications which require, in the preparation process or processing, at least one passage of said flame-retardant composition in a static or dynamic mixer at 180-230° C. Said compositions are more preferably suitable in the preparation of beads of vinylaromatic polymer with an expanding agent via a continuous mass process; in the preparation of extruded foams in the presence of expanding agents; in the preparation of polymeric blends for subsequent transformations in extrusion, thermosetting or injection moulding.

Some illustrative examples are provided for a better understanding of the invention and application range, which, however, should not be considered as limiting the scope of the present invention.

EXAMPLES

Examples of the preparation of copolymers of vinylaromatic monomers and vinyl monomers with bound epoxy groups.

In Example 2, it can be observed that a copolymer at 50% of glycidylmethacrylate cannot be obtained as a thermoplastic polymer (it is, in fact, insoluble and non-processable). Example 3, on the other hand, shows that a block copolymer of 50% polystyrene and 50% styrene-glycidylmethacrylate with 50% glycidyl-methacrylate is processable and soluble. Example 1 produces a random styrene-glycidylmethacrylate copolymer with 14.8% of glycidylmethacrylate not compatible with polystyrene, in Table 3, in fact, the blend EPS3 containing the copolymer of Example 1 does not pass the flame-retardant test. The block copolymer of Example 3 containing 25% of glycidylmethacrylate with respect to the whole block copolymer is compatible with polystyrene and, in the blend EPS4 of Table 3, passes the flame-retardant test.

Summarizing Table 3: EPS1 passes the test, but produces numerous bromides; EPS2 reduces the bromides, but does not pass the test as the epoxidized additive is not homogeneously distributed in the overall composition, EPS3 reduces the bromides, but does not pass the test as the copolymer of Example 1 is not homogeneously distributed in the overall composition; EPS4-EPS8 reduce the bromides and pass the flame-retardant test, showing that the block copolymers of Examples 3-7 are effective, probably because they are uniformly distributed in the polymeric composition.

Example 1

Synthesis of a Random Copolymer 1479.1 g of styrene (Versalis S.p.A., San Donato Milanese-Italy), 212.9 g of glycidylmethacrylate (Sigma-Aldrich, Milan-Italy), 108 g of ethylbenzene (Versalis S.p.A., San Donato Milanese-Italy) and 1.44 g of tert-dodecylmercaptane (Sigma-Aldrich, Milan-Italy) were charged, at 20° C., in a nitrogen atmosphere, into a 2.4 liter glass reactor equipped with an anchor stirrer, a temperature probe immersed in the reaction mixture and a thermostating jacket with circulation of silicon oil thermostat-regulated with an external thermostatic bath. On heating the thermostating oil circulating in the jacket of the reactor, the temperature of the reaction mixture was increased to 125° C. in 2 hours and the reaction temperature was then kept constant at 125° C. for 5 hours. At the end of 5 hours at 125° C., the reaction mixture containing about 50% of polymer was discharged into steel cylinders in fractions of 120 g per cylinder. The cylinders were placed in an oven with electric heating and were heated to 150° C. for 3 hours. At the end of the thermostating period at 150° C., a vacuum was applied in the oven containing the cylinders up to a residual pressure of 20 mbar, the temperature in the oven was then brought to 220° C. in about one hour and kept constant for 30' minutes. After cooling the oven, the polymer contained in the cylinders was extracted and ground in a mill. The polymer granule obtained (1380 g) was analyzed and a content of 14.8% w/w of glycidylmethacrylate was determined (by analysis of the epoxide content with the method ASTM D1652-04) together with a MFR (200° C./5 kg) of 17.1 g/10 min (method ISO 1133).

Example 2

Synthesis of a Random Copolymer

The same procedure was adopted as for Example 1, but the formulation is the following: 846 g of styrene, 846 g of glycidylmethacrylate, 108 g of ethylbenzene and 1.1 g di tert-dodecylmercaptane. The polymer obtained was insoluble and non-processable.

Example 3

Synthesis of a styrene-b-(styrene-glycidylmethacrylate) Block Copolymer Via Controlled Chain Polymerization 1377 g of styrene, 2.23 g of BPO (Luperox A75, ARKEMA), 1.55 g of 40H-TEMPO (Sigma-Aldrich) were charged, at 20° C., into the reactor of Examples 1-2. On heating the thermostating oil circulating in the jacket of the reactor, the temperature of the reaction mixture was increased to 125° C. in 2 hours and the reaction temperature was then kept constant for 2 hours and 15 minutes; 423 g of glycidylmethacrylate were then charged into the reactor and the reaction was continued for 2 hours. 2 hours after the addition of glycidylmethacrylate, the reaction mixture containing about 49% of polymer, was discharged into steel cylinders in fractions of 120 g per cylinder. The cylinders were placed in an oven and a vacuum was applied up to a residual pressure of 20 mbar, the temperature of the oven was then brought to 220° C. in about one hour and kept constant for 30' minutes. After cooling the oven, the polymer contained in the cylinders was extracted and ground in a mill. The polymer granule obtained (900 g) was analyzed and a content of 25% w/w of glycidylmethacrylate was determined, together with a MFR (200° C./5 kg) of 22 g/10 min.

Example 4

Synthesis of a Grafted styrene-g-(styrene-glycidylmethacrylate) Block Copolymer 422.66 g of styrene, 0.34 g of maleic anhydride, 27 g of ethylbenzene and 0.80 g di tert-dodecylmercaptane were charged, at 20° C., into the reactor of Examples 1-3. On heating the thermostating oil circulating in the jacket of the reactor, the temperature of the reaction mixture was increased to 126° C. in 2 hours and the reaction temperature was then kept constant for 6 hours. Upon reaching 126° C., the feeding was initiated into the reactor, of a solution of 450 g of the same composition as the initial mixture, at a flow-rate of 75 g/hour, by means of a membrane pump. After 6 hours, at the end of the feeding of the solution of styrene, maleic anhydride, ethylbenzene and tert-dodecylmercaptane, a mixture consisting of 336 g of styrene, 510 g of glycidylmethacrylate, 54 g of ethylbenzene and 1.6 g of tert-dodecylmercaptane, was charged into the reactor, and, after bringing the temperature of the reaction mixture to 126° C., the temperature was kept constant for 2 hours and 40 minutes. The contents of the reactor containing about 50% of polymer was then discharged into steel cylinders in fractions of 120 g per cylinder. The polymer granule obtained (920 g) was analyzed and a content of 24% w/w of glycidylmethacrylate was determined, together with a MFR (200° C./5 kg) of 16.2 g/10 min.

Example 5

Synthesis of a styrene-b-(styrene-glycidyloxystyrene) Block Copolymer Via Radical Controlled Chain Polymerization 352 g of p-hydroxycinnamic acid (Sigma-Aldrich, Milan-Italy) and 1112 g of N,N dimethylacetamide (Sigma-Aldrich, Milan-Italy), were charged at 20° C., in a nitrogen atmosphere, under stirring, into a 6 liter steel reactor with a discharge at the bottom, equipped with a magnetic entrainment anchor stirrer, reflux cooler, temperature probe immersed in the reaction mixture and a thermostating jacket with circulation of silicon oil thermostat-regulated with an external thermostatic bath. After 10 min, 2.94 g of potassium acetate (Sigma-Aldrich, Milan-Italy) were added, in a nitrogen atmosphere, and, on heating the thermostating oil circulating in the jacket of the reactor, the temperature of the reaction mixture was increased to 150° C. in 2 hours and the reaction temperature was then kept constant at 150° C. for 3 hours and 30 minutes, converting the p-hydroxycinnamic acid to p-hydroxystyrene. After cooling the reaction mixture to 20° C., the reflux cooler was substituted with a distillation head connected to a cooler, a collection tank of the condensate and a vacuum pump. The reaction mixture was concentrated at 40° C., with 33 Pa of residual pressure, removing 556 g of N,N dimethylacetamide, and discharged into a tank under nitrogen. 132 g of potassium hydrate (Sigma-Aldrich, Milan-Italy) finely ground in a dry box, the mixture of p-hydroxystyrene and N,N dimethylacetamide removed from the reactor and 2927 g of epichlorohydrin (Sigma-Aldrich,Milan-Italy), were charged into the reactor with a reflux cooler, washed with N,N dimethylacetamide and in a nitrogen environment. The reaction mixture thus obtained was brought to 90° C. by heating the thermostating oil circulating in the jacket of the reactor, kept at 90° C. for an hour and then cooled to 25° C. The resulting reaction mixture was collected in glass flasks after discharging from the bottom of the reactor. The washing liquid obtained by spraying about 500 ml of N,N dimethylacetamide on the walls of the reactor and on the inserts, was collected in the same flasks. The content of the flasks cooled to 4° C. were filtered on a gutsch having a medium porosity and then on a polytetrafluoroethylene filter with pores having an average diameter of 0.45 microns and washed with 100 ml of N,N dimethylacetamide. The liquid filtered was concentrated in the same 6 liter steel reactor used in the previous reactions. By substituting the cooler with a condensation head and applying a vacuum, the excess epichlorohydrin was removed together with part of the N,N dimethylacetamide. At the end, a solution with about 351 g of p-glycidyloxystyrene and about 355 g of N,N dimethylacetamide is obtained.

249 g of styrene, 2.23 g of BPO, 1.55 g of 40H-TEMPO are added in the same 6 liter reactor containing p-glycidyloxystyrene and N,N dimethylacetamide, in a nitrogen environment. On heating the thermostating oil circulating in the jacket of the reactor, the temperature of the reaction mixture was increased to 125° C. in 2 hours and the reaction temperature was then kept constant for 6 hours and 30 minutes; 4350 g of styrene were then charged into the reactor, the reaction temperature was brought again to 125° C. and the reaction was continued for 1 hour. The reaction mixture was subsequently cooled to 95° C. and, by applying a vacuum, 3050 g of styrene were distilled. After distillation, the reaction mixture containing about 50% of polymer was discharged into steel cylinders in fractions of 120 g per cylinder. The cylinders were placed in an oven and a vacuum was applied up to a residual pressure of 20 mbar, the temperature of the oven was then brought to 220° C. in about one hour and kept constant for 30' minutes. After cooling the oven, the polymer contained in the cylinders was extracted and ground in a mill. The polymer granule obtained (910 g) was analyzed and a content of 32.5% w/w of p-glycidyloxystyrene was determined, together with a MFR (200° C./5 kg) of 20 g/10 min.

Example 6

Synthesis of a styrene-b-(styrene-2,3-epoxypropyl-vinylbenzylether) Block Copolymer Via Radical Controlled Chain Polymerization 133 g of potassium hydrate finely ground in a dry box, 338 g of hydroxymethylstyrene (Sigma-Aldrich, Milan-Italy) and 2940 g of epichlorohydrin were charged in a nitrogen environment into the reactor of Example 5. The reaction mixture thus obtained was brought to 90° C. by heating the thermostating oil circulating in the jacket of the reactor, kept at 90° C. for an hour and then cooled to 25° C. The resulting reaction mixture was collected in glass flasks after discharging from the bottom of the reactor. The washing liquid obtained by spraying about 500 ml of N,N dimethylacetamide on the walls of the reactor and on the inserts, was collected in the same flasks. The contents of the flasks cooled to 4° C. were filtered on a gutsch having a medium porosity and then on a polytetrafluoroethylene filter with pores having an average diameter of 0.45 microns and washed with 100 ml of N,N dimethylacetamide. The liquid filtered was concentrated in the same 6 liter steel reactor used in the previous reaction. By substituting the cooler with a condensation head and applying a vacuum, the excess epichlorohydrin was removed together with part of the N,N dimethylacetamide. At the end, a solution with about 384 g of 2,3-epoxypropylvinylbenzylether and about 390 g of N,N dimethylacetamide is obtained.

216 g of styrene, 2.23 g of BPO, 1.55 g of 4OH-TEMPO are added in the same 6 liter reactor containing 2,3-epoxypropylvinylbenzylether and N,N dimethyl-acetamide, in a nitrogen environment. On heating the thermostating oil circulating in the jacket of the reactor, the temperature of the reaction mixture was increased to 125° C. in 2 hours and the reaction temperature was then kept constant for 7 hours; 4350 g of styrene were then charged into the reactor, the reaction temperature was brought again to 125° C. and the reaction was continued for 1 hour and 15 minutes. The reaction mixture was subsequently cooled to 95° C. and, by applying a vacuum, 3085 g of styrene were distilled. After distillation, the reaction mixture containing about 50% of polymer was discharged into steel cylinders in fractions of about 120 g per cylinder. The cylinders were placed in an oven and a vacuum was applied up to a residual pressure of 20 mbar, the temperature of the oven was then brought to 220° C. in about one hour and kept constant for 30' minutes. After cooling the oven, the polymer contained in the cylinders was extracted and ground in a mill. The polymer granule obtained (905 g) was analyzed and a content of 35.2% w/w of 2,3-epoxypropylvinylbenzylether was determined, together with a MFR (200° C./5 kg) of 24 g/10 min.

Example 7

Synthesis of a Polystyrene-b-Pbu Block Copolymer Epoxidized by Epoxidation of a PS-b-PBu Block Copolymer 3000 g of cyclohexane (Versalis S.p.A., San Donato Milanese-Italy), 2000 g of ethyl acetate (Sigma-Aldrich, Milan-Italy) and 1000 g of EUROPRENE SOL B 183 (styrene-butadiene block copolymer with 11% w/w of butadiene, Versalis SpA, San Donato Milanese Italy), were charged at 20° C., in a nitrogen atmosphere, under stirring, into a 15 liter steel reactor with a discharge at the bottom, equipped with a magnetic entrainment anchor stirrer, a distillation head connected through a cooler to a collection tank, in turn connected to a vacuum pump, a temperature probe immersed in the reaction mixture and a thermostating jacket with circulation of silicon oil thermostat-regulated with an external thermostatic bath. On heating the thermostating oil circulating in the jacket of the reactor, the temperature of the reaction mixture was increased to 40° C. and was then kept constant for 2 hours until the complete dissolution of the elastomer. When the dissolution was complete, 540 g of a mixture of ethyl acetate at 30% of peracetic acid (Sigma-Aldrich, Milan-Italy) were charged in 2 hours, with a dosage pump, and the temperature was kept at 40° C. for a further hour. At the end of the epoxidation reaction, the reaction mixture was cooled to 4° C. and 5 liters of cold demineralized water were charged under stirring. After 15 minutes of stirring, the stirring was interrupted and about 5 liters of aqueous phase were discharged from the bottom of the reactor. The washing with 5 liters of water was repeated a further two times (for a total of three washings). The mixture in the reactor was subsequently heated to 75° C. and a vacuum was applied to distill the solvents and concentrate the solution so as to have 40 parts of elastomer and 60 parts of solvent. The solution at 40% of styrene-butadiene copolymer epoxidized in the residual reaction solvent was discharged into steel cylinders in fractions of about 120 g per cylinder. The cylinders were placed in an oven and a vacuum was applied up to a residual pressure of 20 mbar, the temperature of the oven was then brought to 180° C. in about one hour and kept constant for 15' minutes. After cooling the oven, the polymer contained in the cylinders was extracted and ground in a mill. The polymer granule obtained (990 g) was analyzed and a content of 2.8% w/w of oxirane oxygen was determined.

Verification Examples of the Improved Thermal Stability of EBCD (Examples for EPS and HIPS)

The mixtures indicated in Table 1 (the numbers refer to the parts of each component in the mixture) were dry prepared in a rotating cylinder (mixer), extruded in a Werner twin-screw extruder at 180° C.-220° C. with a residence time of 1-2 minutes and granulated:

TABLE 1

|  | Calcinated Coke 4023 Asbury parts | Polystyrene EDISTIR N2982 parts | Stabilizer parts |
| --- | --- | --- | --- |
| MIX CB1 | 50 | 50 | 0 |
| MIX CB2 | 50 | 48.6 | DGEBPA 1.4 |
| MIX CB3 | 50 | 35.5 | EXAMPLE 1 14.5 |
| MIX CB4 | 50 | 45.4 | EXAMPLE 3 4.6 |

TABLE 1-continued

| | Calcinated Coke 4023 Asbury parts | Polystyrene EDISTIR N2982 parts | Stabilizer parts |
|---|---|---|---|
| MIX CB5 | 50 | 45.2 | EXAMPLE 4 4.8 |
| MIX CB6 | 50 | 45.6 | EXAMPLE 5 4.4 |
| MIX CB7 | 50 | 45.6 | EXAMPLE 6 4.4 |
| MIX CB8 | 50 | 45.3 | EXAMPLE 7 4.7 |

EDISTIR N2982 (Versalis S.p.A., San Donato Milanese-Italy) is a polystyrene homopolymer for general uses (GPPS) with a MFR (200° C./5 kg) of 25 g/10 min.
DGEBPA (Sigma-Aldrich, Milano-Italia) is diglycidylether of bisphenol A.

The mixtures MIX CB1-8 are used for preparing the blends indicated in Table 2 in a rotating cylinder (mixer), extruded in a Brabender extruder at 190° C. with a residence time of 3 minutes and granulated.

TABLE 2

| | EDISTIR N1782 [parts] | Stabilizer [parts] | MIX CB [parts] | PK30 [parts] | EBCD [parts] | HYDROTALCITE at 30% w/w in EDISTIR N1782 [parts] |
|---|---|---|---|---|---|---|
| MB1 | 43.2 | 0 | MIX CB1 45.6 | 1 | 8.7 | 1.5 |
| MB2 | 43.5 | DGEBPA 1.2 | MIX CB2 45.6 | 1 | 8.7 | 0 |
| MB3 | 31.9 | ESEMPIO 1 12.8 | MIX CB3 45.6 | 1 | 8.7 | 0 |
| MB4 | 40.6 | ESEMPIO 3 4.1 | MIX CB4 45.6 | 1 | 8.7 | 0 |
| MB5 | 40.4 | ESEMPIO 4 4.3 | MIX CB5 45.6 | 1 | 8.7 | 0 |
| MB6 | 40.9 | ESEMPIO 5 3.8 | MIX CB6 45.6 | 1 | 8.7 | 0 |
| MB7 | 41.0 | ESEMPIO 6 3.7 | MIX CB7 45.6 | 1 | 8.7 | 0 |
| MB8 | 40.7 | ESEMPIO 7 4.0 | MIX CB8 45.6 | 1 | 8.7 | 0 |

EDISTIR N1782 (Versalis S.p.A., San Donato Milanese - Italy) is a polystyrene homopolymer for general uses (GPPS) with a MFR (200° C./5 kg) of 8 g/10 min.
PK30 (Akzo-Nobel) is 2,3-dimethyl-2,3-dipheniybutane, Perkadox 30.
EBCD (Albemarle) is hexabromocyclododecane, HP900.

Preparation of EPS in Continuous 77 parts of polystyrene EDISTIR N1782 in the form of granules and 23 parts of granule having a composition MB1-MB8 are dry mixed in a rotating cylinder (EPS1-EPS8 in Table 3) and fed to a single-screw extruder which feeds, with a residence time of 7 minutes, at 260 bar and about 190° C., a static mixer at whose inlet 5 parts of a mixture of n-pentane (75%) and iso-pentane (25%) are added. The mixture thus obtained is distributed on holes having a diameter of 0.5 mm, immediately cooled with a jet of water and cut with a series of rotating knives as described in U.S. Pat. No. 7,320,585. The pressure in the granulation chamber is 5 bar and the shear stress is determined so as to obtain granules having an average diameter of 1.2 mm. Water is sprayed as cooling liquid and nitrogen is used as carrier gas of the granules which are then dried with a centrifugal drier and 3 parts of glycerine monostearate, one part of zinc stearate and 0.2 parts of glycerine per 1000 parts of granules are added in a continuous screw mixer. The granules thus obtained are pre-expanded with vapour at 100° C., left to rest for a day and used for the formation of cylinders having a diameter of 260 mm and a height of 40 mm with a density ranging from 14 to 16 g/dm$^3$. The cylinders are placed in a thermostat-regulated chamber at 70° C. for two days. Test samples of 90×190×20 mm are then obtained from the thermostat-regulated cylinders for the flame-resistance tests according to the standard DIN 4102 and determination of the bromides present. The results are indicated in Table 3.

TABLE 3

| | bromides ppm w/w | Flame height cm | Passing of the test according to DIN 4102 yes/no |
|---|---|---|---|
| EPS1 | 2000 | 7.6 | yes |
| EPS2 | 380 | 16.9 | no |
| EPS3 | 390 | 17.3 | no |

TABLE 3-continued

| | bromides ppm w/w | Flame height cm | Passing of the test according to DIN 4102 yes/no |
|---|---|---|---|
| EPS4 | 300 | 8.5 | yes |
| EPS5 | 315 | 9.4 | yes |
| EPS6 | 320 | 9.7 | yes |
| EPS7 | 330 | 9.5 | yes |
| EPS8 | 340 | 10.1 | yes |

The standard DIN 4102 requires that the flame does not exceed a height of 15 cm.

Method for Determining the Bromides

A weighed sample of 0.1-1.5 g (on the basis of the expected bromides) having a polymeric composition containing the brominated compound, is placed in a 50 ml test-tube and dissolved with 15 ml of chloroform. When the dissolution is complete, 25 ml of eluent for ion chromatography (aqueous solution of NaHCO$_3$ 0.0020 M and Na$_2$CO$_3$ 0.0013 M) are added, the test-tube is closed and the mixture stirred for 20'. At the end of the stirring, the organic phase and aqueous phase are left to separate and the latter is analyzed with Metrohm Mod. Compact 761 IC ion chromatography with a Metrohm Dual2 column (Cod. 6.1006.100) and a conductivity suppressor, with a Metrosep A Supp 4/5 pre-column (Cod. 6.1006.500). The concentration of the solution, expressed in ppm w/w, is obtained from the chromatogram.

Preparation Examples of HIPS

The mixtures indicated in Table 4 are dry prepared in a rotating cylinder.

TABLE 4

| | EDISTIR RT441M [parts] | EDISTIR N1910 [parts] | EBCD [parts] | F2200HM [parts] | Stabilizer [parts] |
|---|---|---|---|---|---|
| HIPS1 | 66 | 28.3 | 4.0 | 1.7 | 0 |
| HIPS2 | 75 | 17.0 | 4.5 | 0 | EXAMPLE 3 3.5 |
| HIPS3 | 75 | 16.8 | 4.5 | 0 | EXAMPLE 4 3.7 |
| HIPS4 | 66 | 19.5 | 4.5 | 0 | EXAMPLE 1 10.0 |

EDISTIR RT441M (Versalis S.p.A., San Donato Milanese-Italy) is high-impact polystyrene (HIPS) with a MFR (200° C./5 kg) of 8 g/10 min.
EDISTIR N1910 (Versalis S.p.A., San Donato Milanese-Italy) is a polystyrene homopolymer for general uses (GPPS) lubricated with paraffin oil with a MFR (200° C./5 kg) of 20 g/10 min.
F2200HM is diglycidylether of tetrabromo-bisphenol A, ICL-Industrial Products.

The mixtures thus obtained are extruded in an AMUT single-screw extruder at 190° C. with a residence time of 1-2 minutes and granulated. The granules are moulded in a Battenfeld 350 press at 190° C. to obtain test-samples of 127×12.7×1.59 mm for the flame-resistance tests according to the method UL-94 V as described in "Standard For Tests for Flammability of Plastic Materials For Parts in Devices and Appliances" 3 Edition, Jan. 28, 1980. The mixtures HIPS1-3 belonging to class V2 and in particular the mixtures HIPS2 and HIPS3 have a lower overall bromine content and a higher content of toughened vinylaromatic polymer with respect to HIPS1. The mixture HIPS4, with the same EBCD fraction, even if having an oxirane oxygen content approximately double with respect to the mixture HIPS2, does not pass the flame-resistance test.

The invention claimed is:

1. A self-extinguishing polymeric composition comprising:
   a) a stabilizing polymeric composition containing
      i) from 80% to 99.5% by weight of one or more vinylaromatic polymers; and
      ii) from 0.5% to 20% by weight of at least one block copolymer containing:
         1) at least one vinylaromatic polymer block compatible with said one or more vinylaromatic polymers and that constitutes a weight quantity equal or higher than 15% by weight with respect to the at least one block copolymer, and
         2) at least one vinyl copolymer block containing epoxy groups so that there is from 2.8% to 19% by weight of oxirane oxygen calculated on the total of the at least one block copolymer;
   b) from 0.03 phr by weight to 10 phr by weight, calculated on the base of component (a), of at least one halogenated flame retardant, wherein the one or more vinylaromatic polymers are selected from the group consisting of:
polymers obtained by homo- or copolymerization of vinylaromatic monomers having general formula (I):

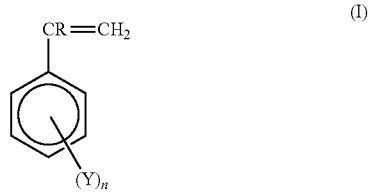

wherein R is a hydrogen or a methyl group, n is zero or an integer ranging from 1 to 3, Y is a halogen, or a chloromethyl or an alkyl or alkoxyl group having from 1 to 3 carbon atoms;

copolymers comprising, as main components, vinylaromatic monomers having formula (I) and vinyl comonomers selected from dienes, nitriles, C$_1$-C$_8$ alkyl esters derivatives of acrylic and methacrylic acid, vinylacetate and mixtures thereof, mixtures of vinylaromatic copolymers, and grafted vinylaromatic copolymers.

2. The self-extinguishing polymeric composition according to claim 1 which comprises from 0 phr to 4 phr by weight, calculated on the base of component (a), of a synergic agent.

3. The self-extinguishing polymeric composition according to claim 2 which comprises from 0.1 phr to 1 phr by weight, calculated on the base of component (a), of said synergic agent.

4. The self-extinguishing polymeric composition according to claim 1 which further comprises from 0.2 phr by weight to 10 phr by weight, calculated on the base of component (a), of an expanding agent.

5. The self-extinguishing polymeric composition according to claim 4 which comprises from 1 phr by weight to 10 phr by weight, calculated on the base of component (a), of said expanding agent.

6. The self-extinguishing polymeric composition according to claim 1 which comprises from 0 phr by weight to 25 phr by weight, calculated on the base of component (a), of an athermanous additive.

7. The self-extinguishing polymeric composition according to claim 6 which comprises from 0.2 phr by weight to 25 phr by weight, calculated on the base of component (a), of said athermanous additive.

8. The self-extinguishing polymeric composition according to claim 7 which comprises from 1 phr by weight to 20 phr by weight, calculated on the base of component (a), of said athermanous additive.

9. The self-extinguishing polymeric composition according to claim 6 wherein the athermanous additive is coke.

10. Expandable beads containing the self-extinguishing polymeric composition according to claim 4.

11. Moulded articles containing the self-extinguishing polymeric composition according to claim 1.

12. Polymeric foams containing the self-extinguishing polymeric composition according to claim 2.

13. Expandable beads containing the self-extinguishing polymeric composition according to claim 6.

14. Moulded articles containing the self-extinguishing polymeric composition according to claim 2.

15. Polymeric foams containing the self-extinguishing polymeric composition according to claim 4.

16. Polymeric foams containing the self-extinguishing polymeric composition according to claim 6.

17. A self-extinguishing polymeric composition consisting essentially of:
   a) a stabilizing polymeric composition containing
      i) from 80% to 99.5% by weight of one or more vinylaromatic polymers; and
      ii) from 0.5% to 20% by weight of at least one block copolymer containing:
         1) at least one vinylaromatic polymer block compatible with said one or more vinylaromatic polymers and that constitutes a weight quantity equal or higher than 15% by weight with respect to the at least one block copolymer, and
         2) at least one vinyl copolymer block containing epoxy groups so that there is from 2.8% to 19% by weight of oxirane oxygen calculated on the total of the at least one block copolymer; and
   b) from 0.03 phr by weight to 10 phr by weight, calculated on the base of component (a), of at least one halogenated flame retardant, wherein the one or more vinylaromatic polymers are selected from the group consisting of:

polymers obtained by homo- or copolymerization of vinylaromatic monomers having general formula (I):

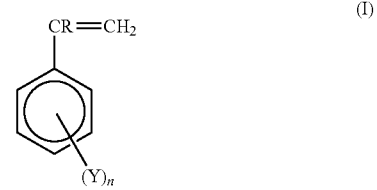

wherein R is a hydrogen or a methyl group, n is zero or an integer ranging from 1 to 3, Y is a halogen, or a chloromethyl or an alkyl or alkoxyl group having from 1 to 3 carbon atoms;

copolymers comprising, as main components, vinylaromatic monomers having formula (I) and vinyl comonomers selected from dienes, nitriles, $C_i$-$C_8$ alkyl esters derivatives of acrylic and methacrylic acid, vinylacetate and mixtures thereof, mixtures of vinylaromatic copolymers, and grafted vinylaromatic copolymers.

* * * * *